(12) United States Patent
Boyd et al.

(10) Patent No.: US 11,378,186 B1
(45) Date of Patent: Jul. 5, 2022

(54) HORIZONTALLY SECTIONED POLYMER GASKET

(71) Applicant: THE PATENT WELL LLC, Fort Worth, TX (US)

(72) Inventors: Matt Boyd, Fort Worth, TX (US); Jeff Busby, Millsap, TX (US); Mike Dry, Fort Worth, TX (US); Kent Boomer, Aledo, TX (US)

(73) Assignee: The Patent Well LLC, Fort Worth, TX (US)

( * ) Notice: Subject to any disclaimer, the term of this patent is extended or adjusted under 35 U.S.C. 154(b) by 81 days.

(21) Appl. No.: 16/411,518

(22) Filed: May 14, 2019

Related U.S. Application Data

(60) Provisional application No. 62/671,567, filed on May 15, 2018.

(51) Int. Cl.
*F16J 15/12* (2006.01)
*F16J 15/10* (2006.01)
*H01Q 1/28* (2006.01)

(52) U.S. Cl.
CPC ........... *F16J 15/122* (2013.01); *F16J 15/102* (2013.01); *F16J 15/123* (2013.01); *H01Q 1/28* (2013.01)

(58) Field of Classification Search
CPC ........ F16J 15/022; F16J 15/102; F16J 15/104; F16J 15/122; F16J 15/127; F16J 15/14; F16J 15/123; B64C 7/00; B32B 2581/00; H01Q 1/28
See application file for complete search history.

(56) References Cited

U.S. PATENT DOCUMENTS

| | | | | |
|---|---|---|---|---|
| 3,532,349 A * | 10/1970 | Czernik | ................ | F16J 15/123 277/598 |
| 4,037,009 A * | 7/1977 | Severinsen | ............ | B32B 25/10 442/1 |
| 6,530,577 B1 * | 3/2003 | Busby | ..................... | B32B 27/04 277/651 |
| 6,695,320 B2 * | 2/2004 | Busby | ..................... | B32B 27/04 277/651 |
| 7,229,516 B2 * | 6/2007 | Busby | ..................... | B32B 27/04 156/247 |
| 9,016,697 B2 * | 4/2015 | Boyd | ..................... | F16J 15/122 277/640 |
| 9,701,388 B2 * | 7/2017 | Busby | ...................... | B64C 1/00 |

(Continued)

*Primary Examiner* — Nicholas L Foster

(57) ABSTRACT

A gasket is disclosed for use as an environmental seal between a first aircraft part having planer surface and a second aircraft part having a planer surface, the two planer parts spread apart and engaged with fasteners. The gasket, in some embodiments, is compressible between the planer surfaces. The gasket, in some embodiments, comprises a first tabular portion having tabular portion properties and having a first tabular thickness and a length and a width, the length and width much greater than the first tabular thickness; and a second tabular portion having tabular portion properties having a second tabular thickness, a length and width, the length and width much greater than the second tabular thickness; and a tabular skeleton. The first and second tabular portions and the skeleton are positioned parallel to one another. The skeleton is at least partly contacting one of the tabular portions. The first tabular portion and the second tabular portion differ in at least one tabular portion property.

14 Claims, 14 Drawing Sheets

(56) References Cited

U.S. PATENT DOCUMENTS

| | | | |
|---|---|---|---|
| 9,702,464 B1* | 7/2017 | Busby | F16J 15/02 |
| 9,765,888 B2* | 9/2017 | Busby | C09D 175/02 |
| 9,769,965 B2* | 9/2017 | Busby | H05K 9/0015 |
| 10,150,555 B2* | 12/2018 | Boyd | B64C 1/18 |
| 10,230,494 B2* | 3/2019 | Busby | B64C 1/00 |
| 10,604,230 B2* | 3/2020 | Boyd | B64C 1/36 |
| 2003/0047885 A1* | 3/2003 | Busby | F16J 15/108 277/650 |
| 2003/0234498 A1* | 12/2003 | Busby | F16J 15/122 277/651 |
| 2004/0041356 A1* | 3/2004 | Smith | B32B 27/08 277/651 |
| 2004/0070156 A1* | 4/2004 | Smith | F16J 15/104 277/651 |
| 2013/0001894 A1* | 1/2013 | Busby | H05K 9/0015 277/653 |
| 2014/0015204 A1* | 1/2014 | Boyd | F16J 15/021 277/640 |
| 2014/0167367 A1* | 6/2014 | Busby | H04L 43/0823 277/639 |
| 2014/0312574 A1* | 10/2014 | Busby | F16J 15/14 277/637 |
| 2014/0326830 A1* | 11/2014 | Busby | H04L 1/0045 244/131 |
| 2015/0069722 A1* | 3/2015 | Boyd | B64C 1/36 277/651 |
| 2016/0017999 A1* | 1/2016 | Boyd | B64C 3/34 277/651 |
| 2016/0018000 A1* | 1/2016 | Busby | C08L 75/02 244/131 |
| 2016/0033043 A1* | 2/2016 | Busby | B64C 1/36 244/131 |
| 2017/0305523 A1* | 10/2017 | Busby | H04L 43/0823 |
| 2018/0241505 A1* | 8/2018 | Busby | H04L 1/0045 |
| 2019/0070757 A1* | 3/2019 | Boyd | C08J 9/38 |
| 2019/0112026 A1* | 4/2019 | Boyd | F16J 15/022 |
| 2019/0162306 A9* | 5/2019 | Busby | F16J 15/104 |
| 2019/0275770 A1* | 9/2019 | Busby | B32B 5/18 |

* cited by examiner

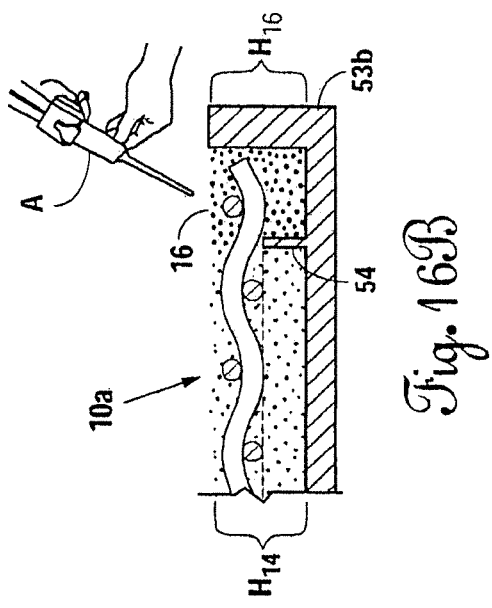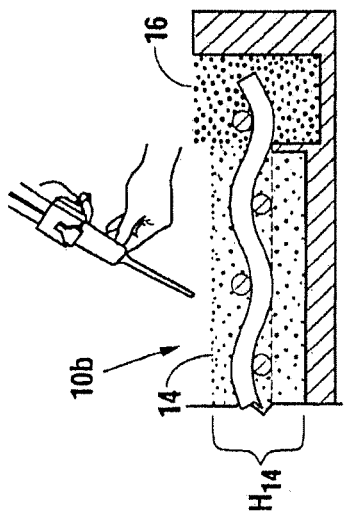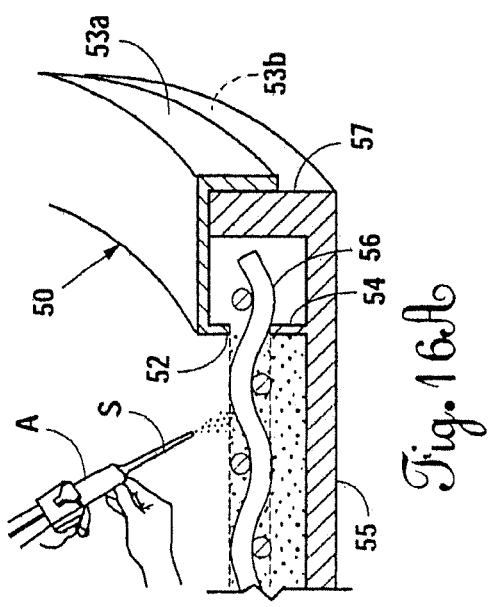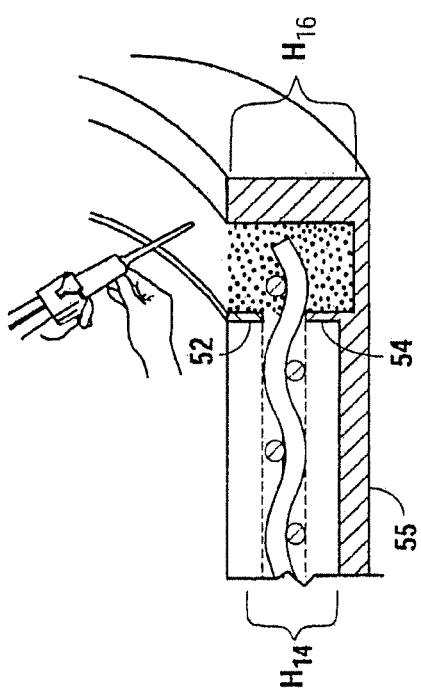

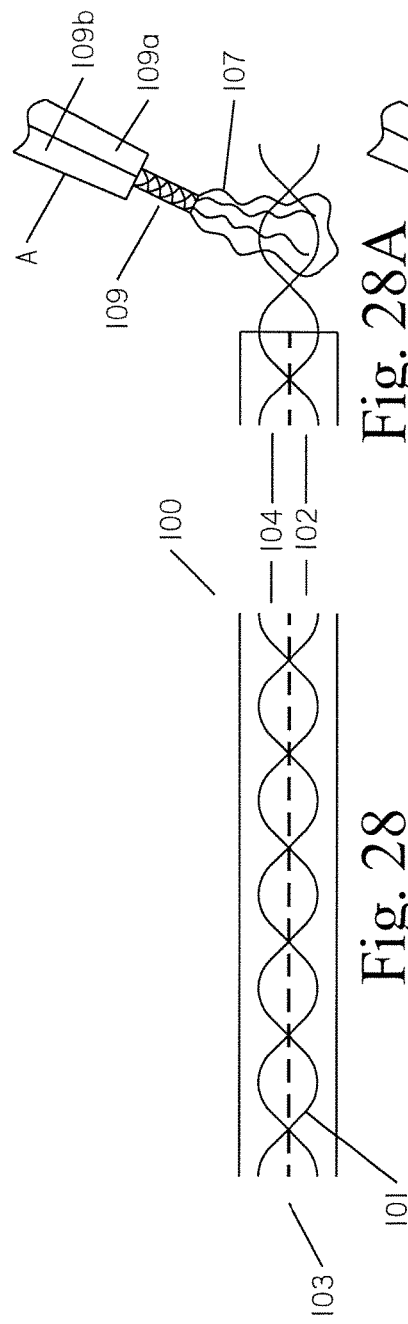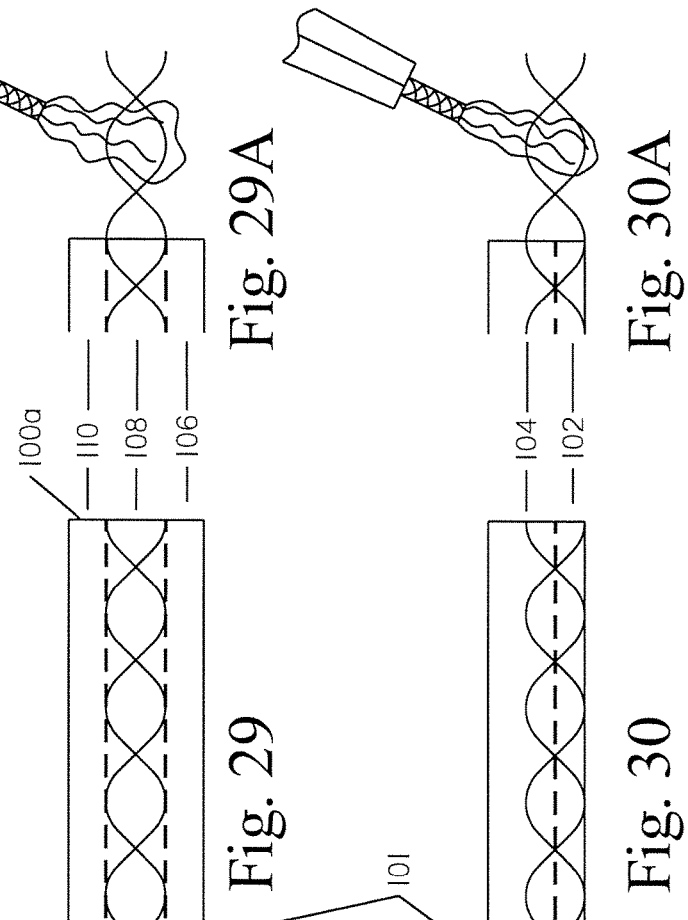

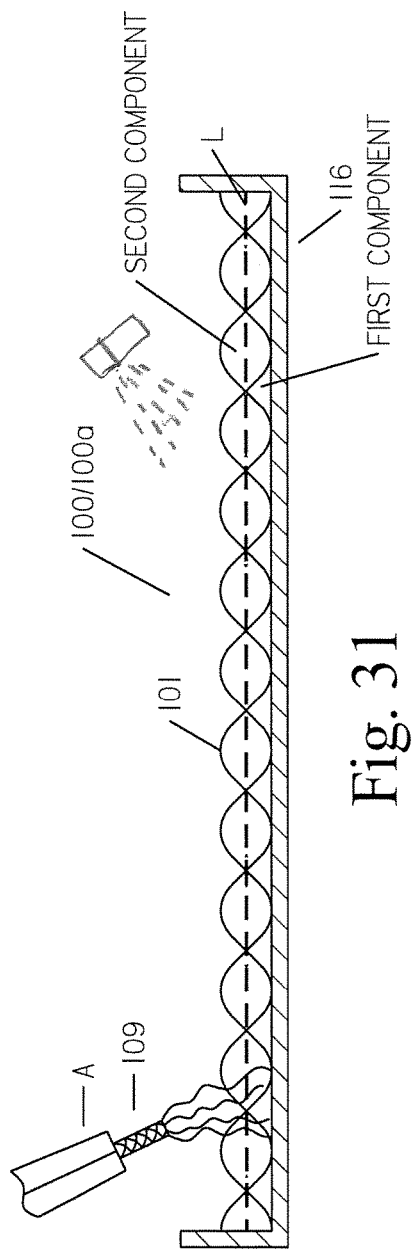
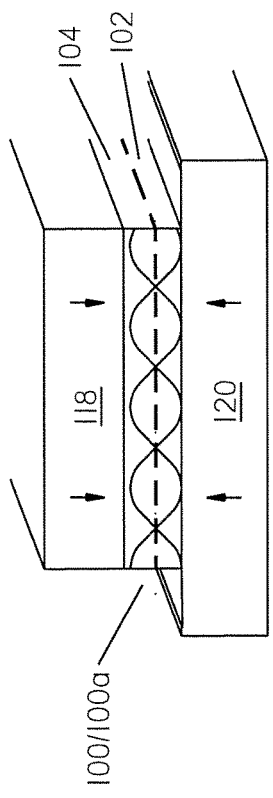
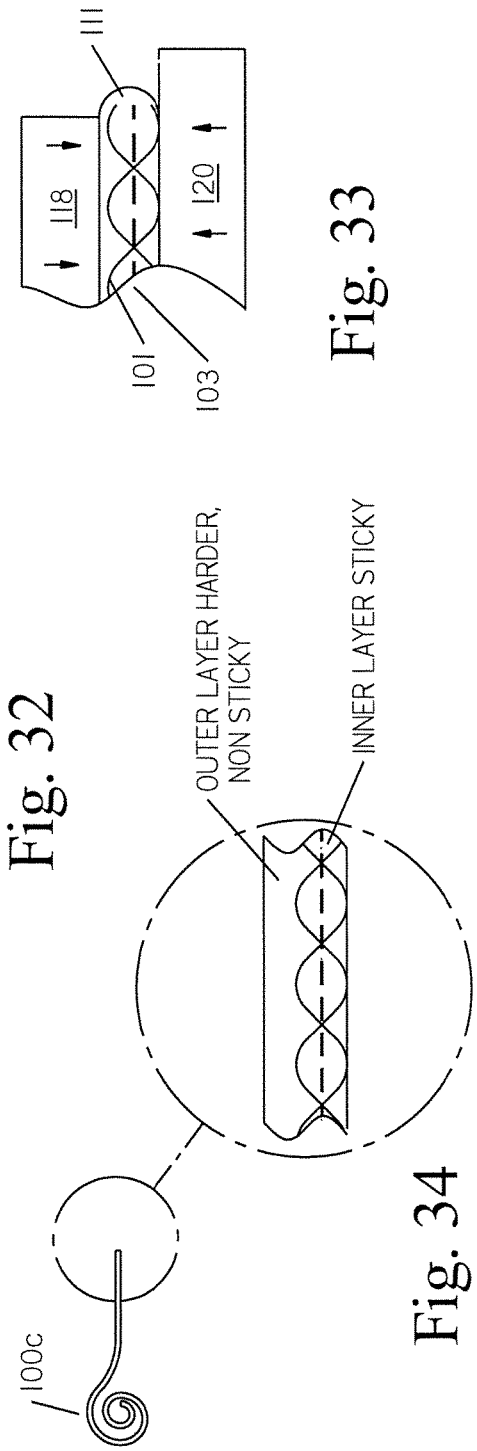

HORIZONTALLY SECTIONED POLYMER GASKET

This application claims priority to and the benefit of U.S. Application No. 62/671,567, filed May 15, 2018, and incorporates herein by reference U.S. application Ser. No. 13/469,603, filed May 11, 2012, now U.S. Pat. No. 9,701,388.

FIELD OF THE INVENTION

Gaskets, including aircraft gaskets, having a perimeter of greater firmness than the non-perimeter, more tacky portion thereof.

BACKGROUND OF THE INVENTION

Gaskets provide a mechanical seal that fills the space between two mating surfaces. They may be provided to prevent leakage from or into the pieces under compression. Gaskets typically can allow less than perfect mating surfaces on machine parts where they can fill irregularities. Gaskets are commonly produced from cutting sheet materials, such as gasket paper, rubber, silicon, metal, cork, felt, neoprene, nitrile rubber, fiberglass or plastic polymer, such as polychloro and trifloro ethylene.

Pre-cured polyurethane and antenna gaskets have been provided with aluminum skeletal carrier die cut to fit the workpiece, such as an aircraft antenna. The polyurethane provides an effective environmental sealant. It also demonstrates excellent cohesion after installation and provides a high degree of environmental protection, still allowing for easy removal of the workpiece.

Polyurethane provides a non-hazardous seal with no silicon oil residue before, during or after installation or removal. Moreover, polyurethane is not problematic with paint adhesion or preparation and there is no peripheral silicon contamination. Polyurethane provides a positive moisture barrier for easy workpiece removal and provides noise and vibration dampening.

In some applications, however, some polyurethane may creep under compression creating an overrun outside the gasket area. This may sometimes require manual removal.

SUMMARY OF THE INVENTION

A gasket for use as an environmental seal between a first aircraft part having planer surface and a second aircraft part having a planer surface, the two planer parts spread apart and engaged with fasteners, the gasket compressible between the planer surfaces, the gasket comprising: a first tabular portion having tabular portion properties and having a first tabular thickness and a length and a width, the length and width much greater than the first tabular thickness; a second tabular portion having tabular portion properties having a second tabular thickness, a length and width, the length and width much greater than the second tabular thickness; and a tabular skeleton; wherein the first and second tabular portions and the skeleton are all positioned parallel to one another; wherein the skeleton is at least partly contacting one of the tabular portions; and wherein the first tabular portion and the second tabular portion differ in at least one tabular portion property; wherein the differing tabular portion property is hardness; wherein one of the first or second tabular portions has a hardness range of 30 to 150, 35 gram penetrometer; wherein the differing tabular portion property is peel strength; wherein one of the first or second portion has a peel strength of between 0.50 and 20 piw; wherein the other of the tabular portions has a peel strength different but still in the range of 0.50 and 20 piw; wherein the differing tabular portion property is transparency; wherein the first and second tabular portions and the skeleton are selected from materials such that the gasket is Fluid Resistant (per ASTM D-543); wherein the first and second tabular portions and the skeleton are selected from materials such that the gasket is Flame Retardant (per FAR 25.853a); wherein the gasket further includes an edge portion in contact with at least one of the tabular portions; wherein the gasket further includes an edge portion in contact with the skeleton and the first and the second tabular portions.

Various embodiments of Applicant's device are enclosed, which feature a gasket having a skeletal member having a pliable body, wherein the pliable body typically includes a first portion having a first firmness and a second, perimeter portion, having a firmer consistency. When such a composite body is placed under compression, the perimeter will tend to limit the flow of the softer inner material past the firmer perimeter region or portion of the gasket. In this manner, creep or overrun of the less firm first portion material will be substantially reduced or eliminated.

BRIEF DESCRIPTION OF THE DRAWINGS

FIGS. 16A and 16B illustrate in cross-sectional view a manner of manufacturing the first embodiment of Applicant's device.

FIGS. 17A and 17B illustrate in cross-sectional elevational view a method of making the second embodiment of Applicant's improved gasket.

FIGS. 28 and 28A illustrate a horizontally sectioned gasket, with FIG. 28A showing an exposed mesh.

FIGS. 29 and 29A illustrate another embodiment of a horizontally sectioned gasket, with FIG. 29A showing an exposed mesh.

FIGS. 30 and 30A illustrate yet another embodiment of a horizontally sectioned gasket, with FIG. 30A showing an exposed mesh.

FIG. 31 illustrates a method of making a horizontally sectioned gasket.

FIGS. 32 and 33 illustrate the horizontally sectioned gaskets with aircraft parts.

FIG. 34 illustrates a horizontally sectioned gasket, in some embodiments, in tape form.

DETAILED DESCRIPTION OF THE PREFERRED EMBODIMENT

Figure 1:
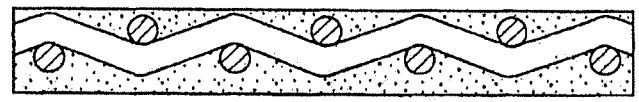
FIG. 1 is a side elevational cutaway view of one embodiment of prior art gaskets as taught by the following U.S. Pat. Nos. 7,229,516; 6,695,320; and 6,530,577, all of which are incorporated herein by reference.
Figure 2:
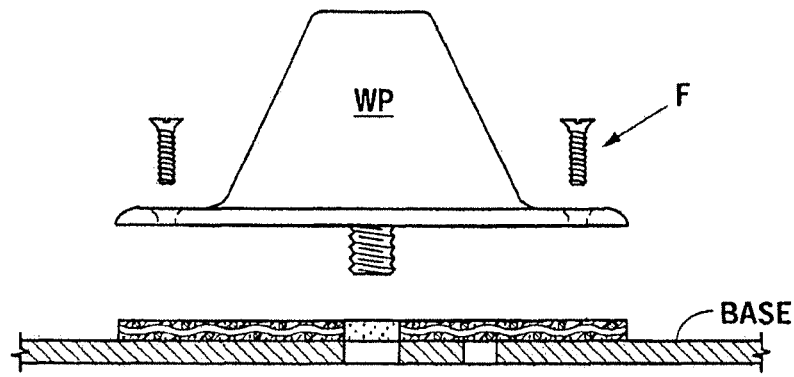
FIG. 2 is an exploded side elevational view of a prior art gasket, such as that in FIG. 1 used under compression between a workpiece WP and a base.
Figure 3:
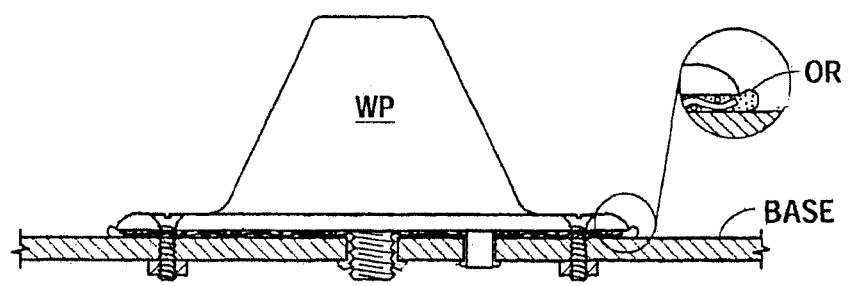
FIG. 3 is the illustration of FIG. 2, with the gasket in place and under compression between the workpiece and the base, illustrating overrun "OR" of some of the gasket material where it has seeped out past the edge of the workpiece outer perimeter.

FIGS. 4A thru 4D illustrate a first embodiment 10a of Applicant's improved gasket. Gasket 10a, like the embodiments that follow, will provide for a workpiece WP to Base mechanical seal over substantially the entire surface of the workpiece and the base beneath the workpiece.

The pre-compression thickness of the embodiments set forth herein may be about 55 mil (range about 25-100 mil). Gasket 10a comprises of a resilient body 12, typically made from pre-cured polyurethane gasket material, such as KBS, Fort Worth, Tex., as disclosed in the patents that are incorporated by reference. Body 12 is seen to have a first portion 14 having a first firmness, such as a firmness between about 75 and about 150 (measured with a 37.5 g half cone penetrometer). The second firmer perimeter portion 16 is seen to comprise the outer perimeter of the gasket, which generally mimics the shape of the outer perimeter of the workpiece, in which second firmer perimeter portion 16 may have a durometer hardness "00" of between about 15 and about 75. The perimeter portion may be made from HT3326-5 and the body or inner portion may be made from a mix of P-1011 and U-1010. This will provide a gasket within the firmness range set forth in this paragraph.

It is seen that the relationship of the first portion to the second portion is one of typically close, adjacent, contiguous integral and/or intimate relation of one portion with respect to the other along common face 23. That is to say, they lay adjacent one another and indeed may intermingle one portion to the other at least close to the boundary portion or common face 23 between the first and second portions. Moreover, it is seen with reference to FIGS. 6, 8, 10, 12, and 14 that, while the first, less firm portion 14 may be typically tabular in nature, the second firmer perimeter portion 16 may take a number of cross-sectional configurations. These configurations may be varied, first to provide an effective seal, under compression, against overrun of the first portion outside the boundaries generally defined by the second perimeter portion, as well as to provide an effective and an aesthetically pleasing mechanical seal. In some cases, a bead portion, or more generally, a formed portion extending beyond the perimeter of the workpiece (see, for example, the detail view of FIG. 7) is provided.

That is to say, Applicant provides for a number of cross-sectional configurations to the second, firmer perimeter portion 16, which are designed to provide both an effective seal and/or a visually pleasing perimeter. This is achieved, in part, by providing a second material at an outer perimeter having a firmer consistency, while being substantially integral with the first portion 14.

Some embodiments of Applicant's gaskets disclosed herein have configured second portions 16 as more generally described hereinbelow. The shapes may generally be described as: 10a tabular; 10b tabular (with raised lips); 10c curved (convex); 10d toothed or ribbed; 10e curved (concave); and 10f trapezoid.

In the embodiments illustrated, a flexible skeleton 18/20 is provided. The flexible skeleton 18/20 is in the embodiment illustrated in FIG. 4A, a mesh skeleton 18, such as woven 5056 aluminum alloy for conductive applications or woven fiberglass for non-conductive applications, or as seen in FIG. 4B, may be seen to be a non-mesh, flexible solid fabric 20, such as polytetrafluoroethylene (PTFE) or any suitable material.

In either form of flexible skeleton 18/20, it is seen that the skeletal member is usually substantially encapsulated in the resilient body 12 and may add strength to the gasket as well as integrity between portions 14/16 as, seen in the illustrations, the skeletons 18/20 typically extend substantially throughout first portion 14 and typically, at least partially, into perimeter or second portion 16.

Figure 4A:
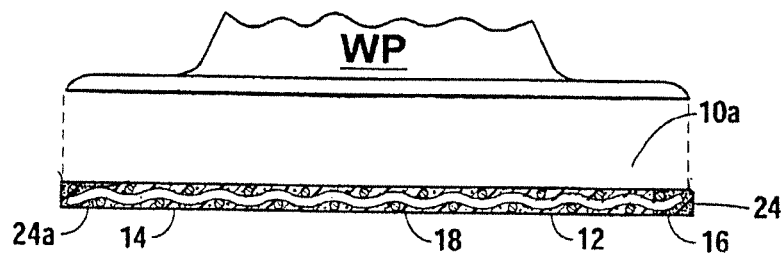
FIG. 4A is a side, cutaway elevational view of a first embodiment of Applicant's dual firmness gasket having a skeletal member.
Figure 4B:
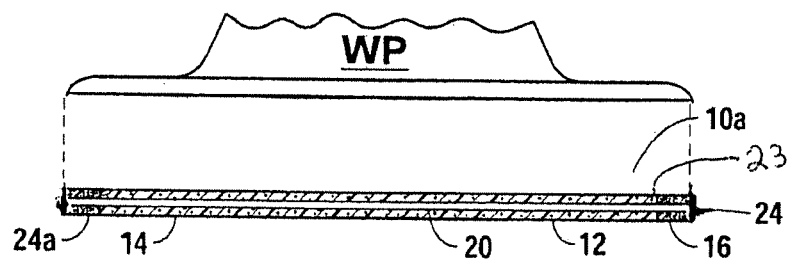
FIG. 4B illustrates a side elevational view in cross-section of first embodiment of Applicant's new gasket and the manner in which it aligns with the workpiece outer perimeter prior to compression between the workpiece and the base.
Figure 4C:
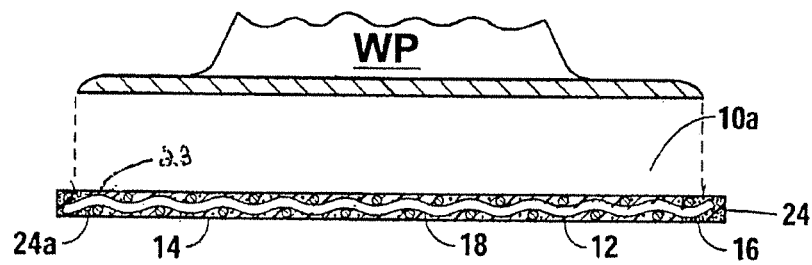
FIG. 4C illustrates the first embodiment in an "overcut application of Applicant's improved gasket in a side elevational view illustrating the relationship between the firmer perimeter of the gasket and the perimeter of the workpiece prior to compression, wherein the outer perimeter of the gasket extends slightly beyond the outer perimeter of the workpiece.

Turning to FIGS. 4A and 4B, it is seen that the first embodiment of Applicant's device provides a relatively narrow second portion 16 in cross-section 24A, at least compared to the first portion, which second portion 16 may have a width of about 75 to about 250 mil. As set forth above, in embodiment 10a, the pre-compression thickness of first and second portions is the same, typically about 55 mil (range 25-100 mil). The other embodiments may have similar or different dimensions.

It is seen that the embodiment 10a illustrated in FIGS. 4A-4D (or any other embodiment) may take, positionally, one of the three locations with respect to the pre-compression of the gasket adjacent the workpiece. In FIG. 4B, it is seen that improved gasket 10a may be dimensioned, for example, die cut or molded, such that the outer edge of the second portion 16 is vertically aligned with the outer edge of the workpiece, such as the outer edge of an aircraft antenna, attached to a base which may represent the fuselage of the aircraft.

In FIG. 4B, the cut of the gasket with respect to the workpiece will be called straight or regular cut. However, in 4C it may be seen that body 12, typically second portion 18 thereof and, optionally, skeleton 18/20 extends pre-compression slightly beyond the outer edge of the workpiece of the gasket. The gasket of FIG. 4C may be termed "overcut." Turning to FIG. 4D, an "undercut" gasket may be seen wherein the outer edge of the outer perimeter portion 16 and skeleton 18/20 does not reach, pre-compression, the outer edge of the workpiece.

The straight or regular cut gasket may be desired where there is only a slight bulge desired, post-compression, of the gasket at the workpiece perimeter. On the other hand, a slight overcut gasket may be provided to improve the aesthetics of the sealing adjacent the workpiece base and outer perimeter area see in FIG. 4C.

Figure 4D:
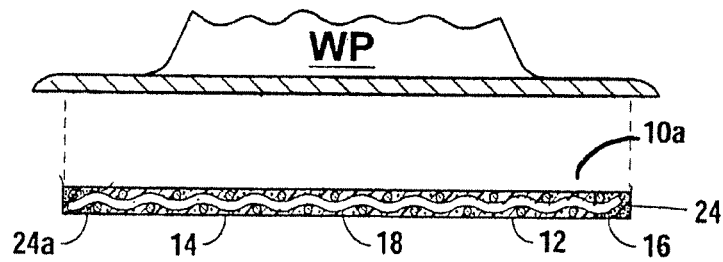
FIG. 4D illustrates the first embodiment in an "undercut" application of Applicant's improved gasket wherein the firmer outer perimeter of the gasket is undercut and wherein prior to compression the outer perimeter of the workpiece extends slightly beyond the outer perimeter of the gasket.
Figure 4E:
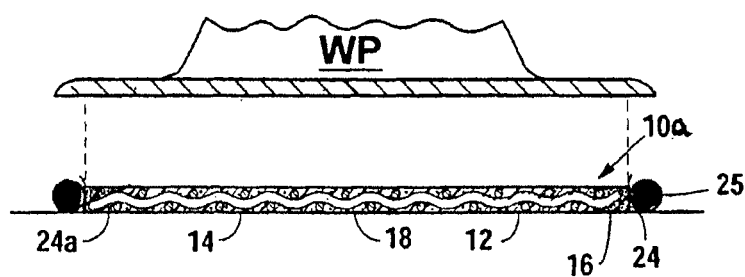
FIGS. 4E and 4F illustrate side elevational views of an embodiment of Applicant's invention having a separate perimeter member, engageable after attachment of workpiece and gasket to the base.
Figure 4F:
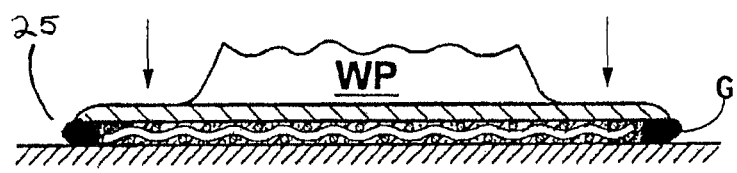
Figure 5:
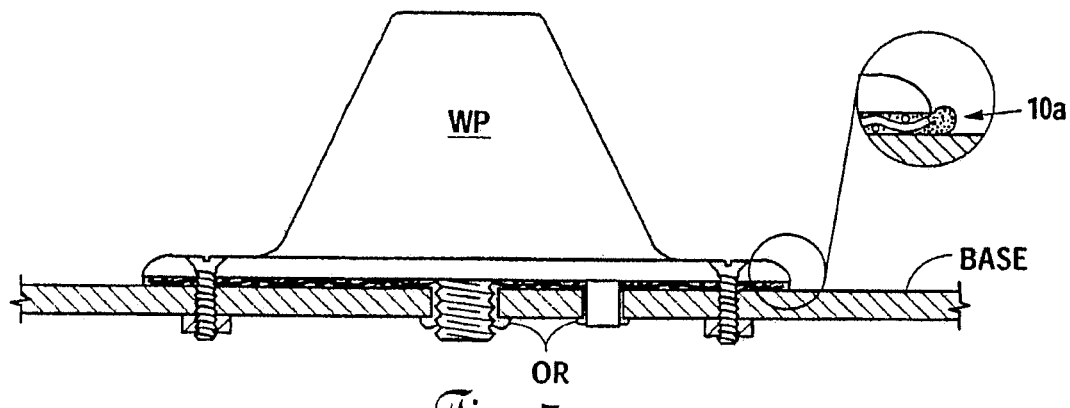
FIG. 5 illustrates a side elevational view of a first embodiment of Applicant's improved gasket as set forth in FIGS. 4A and 4B, under compression between a workpiece and a base, illustrating the manner in which the firmer outer perimeter reduces seepage or overrun along the outer perimeter of the workpiece.

In FIGS. 4E and 4F, undercut gasket 10a may be used for a number of reasons, including the ability to leave a slight gap post-compression for the insertion of a second material or a second gasket 25, bead or an O-ring or the like in the gap G created between the workpiece and Base (outer edge) post-compression.

FIGS. 4E and 4F illustrate the embodiment of Applicant's device using an undercut pre-cured gasket 10a, which may be a gasket comprised of a pre-cured sticky gasket 10g of either the single or dual firmness. It is undercut and even under compression may leave a small gap G, that is, a recess back from the outer edge of the workpiece. Applicant may provide a pre-cured, preformed elastomeric second gasket 25. Second gasket 25 is configured to lay adjacent the outer perimeter of pre-cured gasket 10a. Workpiece is placed under slight compression and an elastic UV resistant gasket 25 is urged at least partially into gap G. Further compression may be applied to allow some of the body 12 to be squeezed up to the inner boundaries of undercut gasket 10a and also allow the outer edge of second gasket 25 to protrude from gap G as seen in FIG. 4F.

In other applications, the undercut of FIG. 4D may be limited to from several mil up to about 250 mil, in which case, under compression, the expansion of the second portion 15 may move it out slightly so it is flush with the outer edge of the workpiece. In still other embodiments, the undercut may remain under either partial or full compression and a flowable curable polyurethane or other suitable material may be applied at the gap at the undercut (see below). The applied material may itself provide a bead beyond the edge of the workpiece.

FIGS. 6, 8, 10, 12, and 14 illustrate additional embodiments (two through six) 10b, 10c, 10d, 10e, and 10f, respectively, of Applicant's improved gaskets, each illustrating differences in the shape of second portion 16 may take as set forth in more detail below.

By varying the shapes of the outer edges, including the cross-sectional shapes, in some cases a more effective seal may be provided, as may be needed in different applications. Further, the post-compression visual aesthetics of the seal may be enhanced.

It is noted that any of the embodiments 10a-10f may be straight cut, undercut or overcut as needed for effective sealing and/or aesthetic purposes. Moreover, it is seen that any of the embodiments may have a differential firmness wherein the softer first portion 14 has a first or greater tackiness than the outer portion 16, which may be firmer and less tacky.

Figure 6:
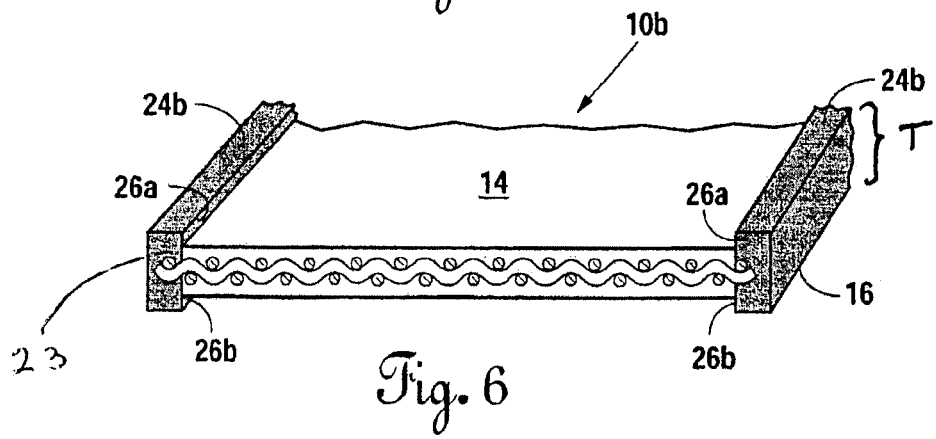
FIG. 6 illustrates a side cutaway perspective view of a second embodiment of Applicant's improved gasket.

FIG. 6 illustrates a cross-sectional shaped perimeter 24b of the second flexible firmer outer portion 16 at the perimeter of the body 12 of embodiment 10b. Cross-section 24b is seen to be similar to cross-section 24a of embodiment 10a (see FIG. 4E). Cross-section 24a has three generally straight sides and a common face 23 and a thickness approximately equal to the first portion 14. Cross-section 24b of embodiment 10b (see FIG. 6) is seen to have an upper lip 26a and a lower lip 26b extending above and below the top surface 14a and bottom surface 14b of the first portion 14. Lips 26a/26b may extend several mil (or typically up to about 20 mil) above the thickness of first portion 14 defined as the distance between top surface 14a and bottom surface 14b thereof. Typically the overall thickness T of the regular sided rectangle seen in cross-section 24b is about 75 mil (range about 25 mil to 100 mil) or any other suitable thickness.

Figure 7:
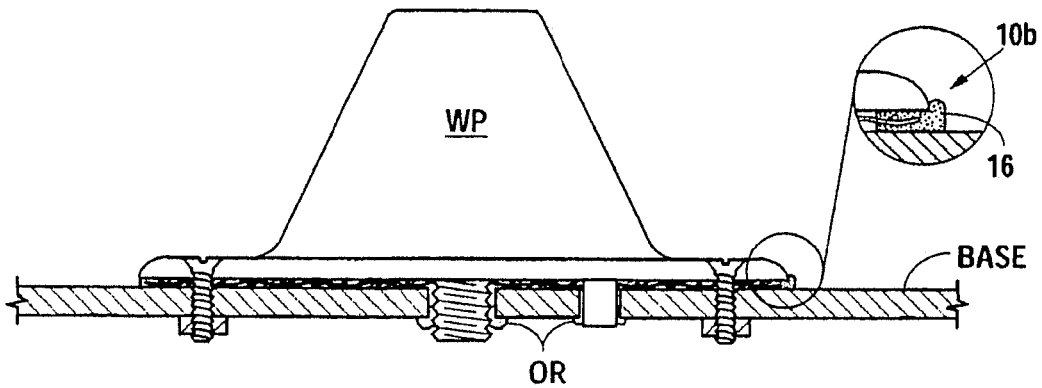
FIG. 7 is an illustration of the embodiment of FIG. 6 under compression between a workpiece and a base.

FIG. 7 illustrates that a regular cut or slightly overcut embodiment 10b of Applicant's improved gasket may provide a slightly contoured or bulging profile, seen in cross-section across the outer edge of the workpiece. Gasket 10b is seen under compression between a workpiece which may be an aircraft antenna and a base which may be an aircraft fuselage.

Figure 8:
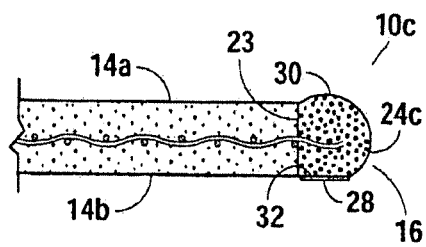
FIG. 8 illustrates a third embodiment of Applicant's improved gasket in side cross-sectional elevational view.
Figure 9:
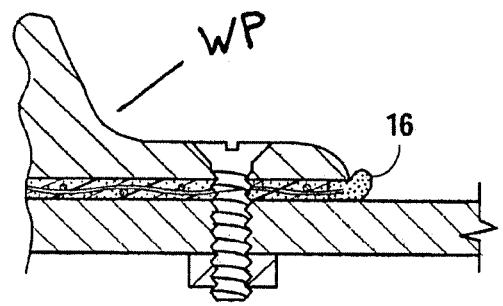
FIG. 9 illustrates a cross-sectional view of the gasket set forth in FIG. 8, under compression showing the edge of a workpiece and the edge of a base.

FIGS. 8 and 9 illustrate a perimeter cross-section 24c that is seen to be plano-convex gasket 10c. Here, as with the embodiments set forth in 10a/10b, there is a common face 23 between firmer perimeter portion 16 and less firm first portion 14. Here a convex section 30 covers an arc typically greater than 90° and a planar section 32 represents an extension of bottom surface 14b. An adhesive strip 28, such as double sided tape, may be provided along planar section 32 on this embodiment or any other embodiment, which may provide for pre-compression placement and positioning of any of the improved gaskets against either the workpiece or the base prior to compression.

FIG. 9 illustrates one configuration that the embodiment illustrated in FIG. 8, embodiment 10c of Applicant's improved gasket, may take under compression between the workpiece and base. A rounded surface, in profile, may be seen extending slightly beyond the edge of the workpiece.

The increased thickness of the second portions, as illustrated in embodiments 10b-10e, are believed to, in part, provide greater resistance to the migration of the soft material of first portion 14 and the prevention of overrun outside the outer perimeter of Applicant's dual firmness or composite gasket.

Figure 10:
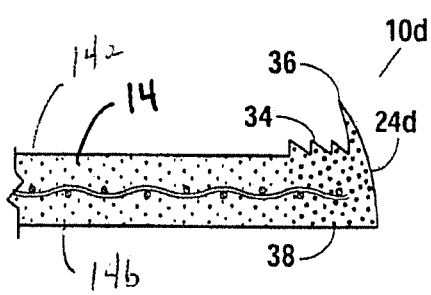
FIG. 10 is a fourth embodiment of Applicant's present invention in cross-sectional elevational view.
Figure 11:
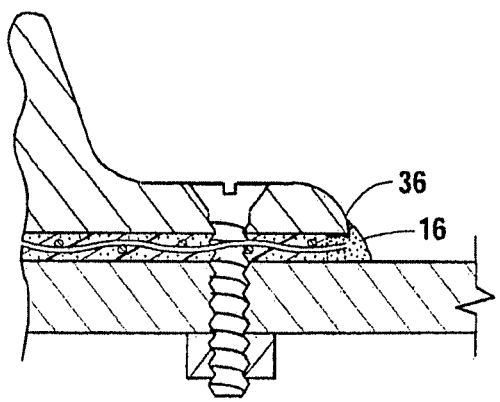
FIG. 11 illustrates the embodiment of FIG. 10 under compression between a workpiece and a base, along the edge of the workpiece.

In FIG. 10, illustrating embodiment 10d, a ribbed toothed surface 34 is provided as seen in cross-section 24d, as either an upper or a lower surface of the perimeter portion 16 (ribbed toothed upper surface shown). The toothed upper surface may help prevent creep or overrun of the material comprising the first portion 14 as it provides ridges that will flatten somewhat under compression. Moreover, improved gasket 10d may include an upstanding wall portion 36 may be provided in the overcut area for both aesthetic and creep prevention. In FIG. 11, it is seen how outer walled portion 36 may be contoured to fit snugly adjacent the outer perimeter of the workpiece. The cross-sectional view seen in FIG. 10 may be termed a toothed-wall.

Figure 12:
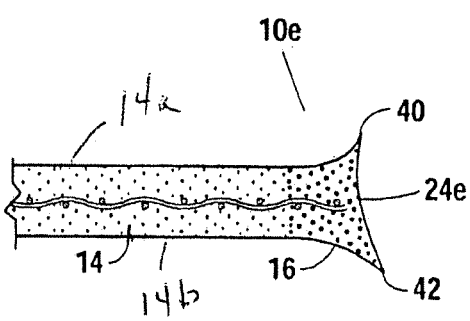
FIG. 12 illustrates a fifth embodiment of Applicant's improved gasket in cross-sectional elevational view.
Figure 13:
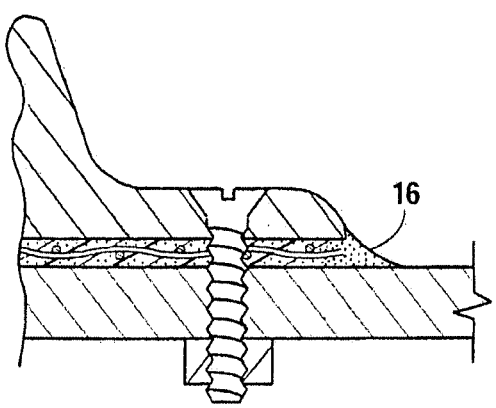
FIG. 13 illustrates the embodiment of FIG. 12 in cross-sectional elevational view under compression at or near the perimeter of a workpiece.

Turning to FIGS. 12 and 13, yet another embodiment 10e of Applicant's improved gasket is illustrated. Embodiment 10e may be seen to provide a perimeter portion 16 that is multi-concave in cross-section 24e, here having concave top and bottom walls and, optionally, a concave outer wall. This may provide for a slight concavity to the post-compression shape and sealing against the surface of the workpiece as illustrated in FIG. 13.

Figure 14:
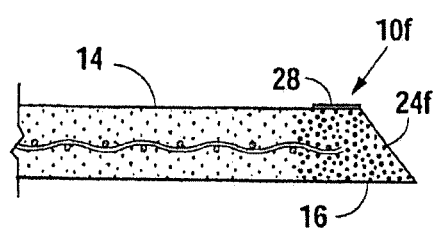
FIG. 14 illustrates a sixth embodiment of Applicant's present invention in cross-sectional side elevational view.
Figure 15:
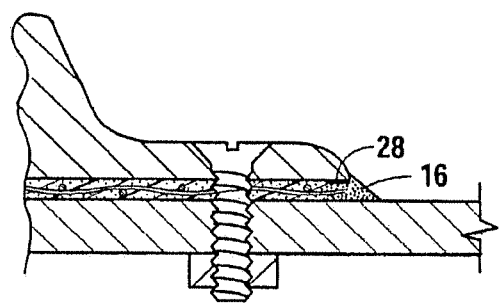
FIG. 15 illustrates the gasket of FIG. 14 under compression between the workpiece and a base, near the edge of the workpiece.

FIGS. 14 and 15 illustrate the use of double adhesive strip 26 on a top wall of perimeter portion 16 and another embodiment 10f with a shaped cross-section 24f, here having a trapezoid (parallelogram) or quadrilateral shape with the face opposite common face 23 being slanted, typically outward from the top to bottom. While the thickness of outer portion 16 is illustrated to be the same as inner portion 14, outer portion 16 may be thicker. As in other embodiments, the embodiment 10f of Applicant's improved gasket may be either straight cut, undercut or slightly overcut. In FIG. 15, embodiment 10f is illustrated under compression.

FIGS. 16A thru 21B illustrate methods of preparing Applicant's various embodiments of their improved gasket.

FIGS. 16A and 16B illustrate a cross-sectional view in which a two-piece mold or multi-piece mold 50 is provided for embodiment 10a, wherein multi-piece mold 50 is defined by a top divider 52 and a bottom divider 54, with a gap 56 therebetween for the skeleton to protrude through. The two separate pieces are provided in a base 55 providing an upstanding bottom divider 54 and an outside wall 57. A second piece may include top divider 52, which along with bottom divider 54, will be typically very thin metal, which may be either solid or perforated to allow flow of the first material comprising first portion 14 and a second material providing the second portion 16 thereof, so there may be intermingling during cure.

A cap 53, including top divider 52, may be removed and, to start the procedure, skeleton 18/20 is placed across base 53 supported on the top edge of bottom divider 54 and extending partway past bottom divider 54 into space that will be filled with the second (firmer) composition. The first composition may then be poured pre-mixed in the snout S of the applicator A in known ways, and allowed to self-level to the desired height, here H 14 and H 16 being equal. Following curing, cap 53 and top divider 52 are removed leaving the cross-section illustrated in FIG. 15B. At this point, applicator A, this time having second material, a composition firmer than the composition of the first material, will be applied to level H 16. When this cures, the gasket 10a can be carefully removed and is ready for use.

FIGS. 17A and 17B illustrate similar procedures, which can be used when H 16 is greater than H 14, for embodiment 10b. Here it will be seen that top divider 52, bottom divider 54, and gap 56 add up to a height of about H 16. Here, perimeter 16 can be poured first, allowed to cure and, after removal of top divider 16, the first portion 14 can be injected to a height of approximately H 14 leaving, when cured, a gasket substantially resembling embodiment 10b with a cross-section 24b.

Figure 18B:
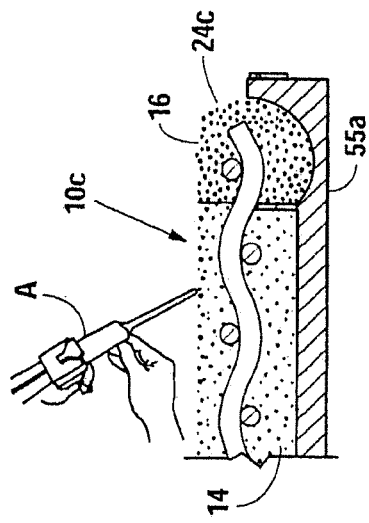
FIGS. 18A and 18B illustrate in cross-sectional view, a method of making the third embodiment of Applicant's present invention.
Figure 18A:
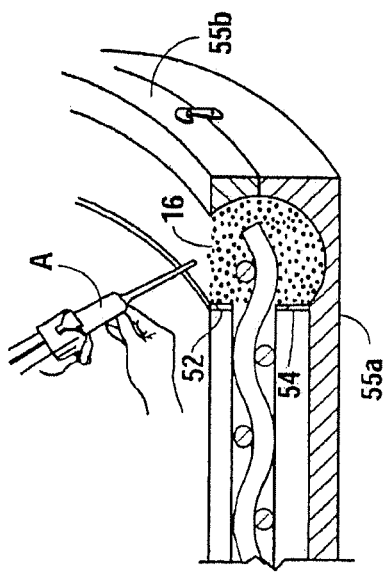

FIGS. 18A and 18B illustrate a manner in which a two-piece base 55 having lower portion 55a and upper portion 55b may be joined together to provide the curved section of embodiment 10C. Here, outer portion 16 may be injected first and then inner portion 14 may be injected to the desired height. Portion 55b of base 55 may be removed for ease of removal of the gasket embodiment 10c having cross-section 24c following curing of both portions 14/16.

Figure 19B:
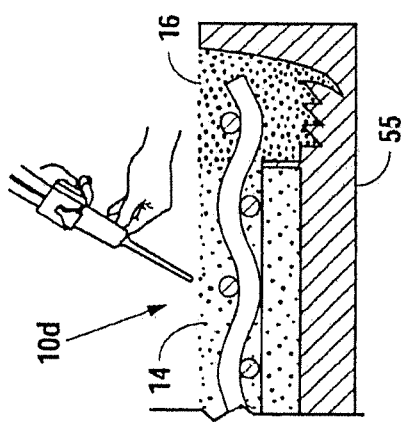
FIGS. 19A and 19B illustrate in cross-sectional side elevation, a method of making the fourth embodiment of Applicant's gasket.
Figure 19A:
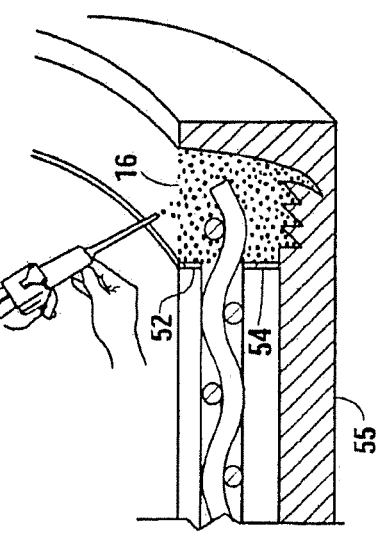

FIGS. 19A and 19B also disclose the two-step method and two piece molds of the previous embodiment providing a first pouring or injecting of one of the first or second portions when the top divider and bottom divider are adjacent one another and a second pouring of the other or first or second portion following the removal of the top divider. Here, it is seen that base 55 is provided with a surface that is shaped to conform to the desired shape of outer portion 16, here, see 24d of embodiment 10d.

FIGS. 20A, 20B, 21A, and 21B also illustrate a manner of configuring the mold, typically in two pieces, to conform to the desired end product having a specifically configured first portion 14 and a second portion 16 of a different, harder consistency.

Figure 20A:
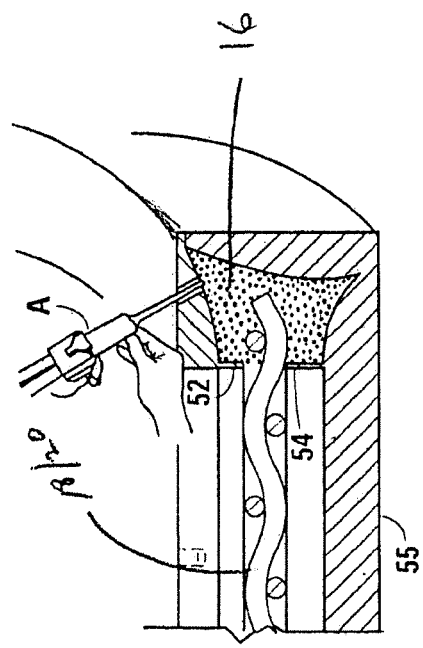
FIGS. 20A and 20B illustrate a method of making the fifth embodiment of Applicant's improved gasket.
Figure 21A:
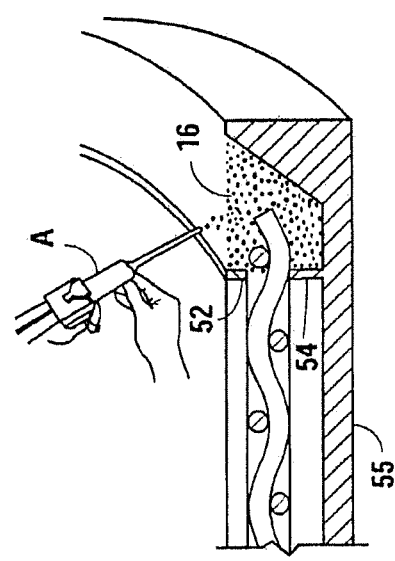
FIGS. 21A and 21B illustrate a method of making the sixth embodiment of Applicant's improved gasket.
Figure 20B:
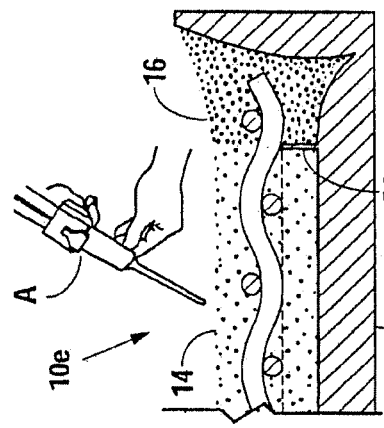
Figure 21B:
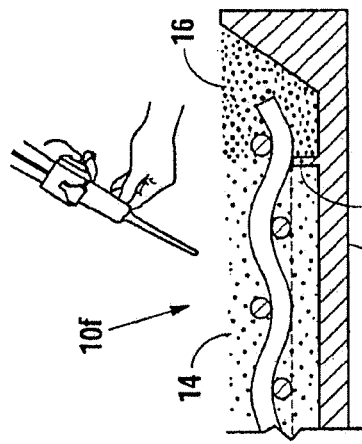

FIG. 20A illustrates top divider and bottom divider working together to provide a perimeter region in which a flowable, pre-cured mix can be injected to provide a proper or suitable shape to the firmer portion, while allowing some of the skeleton to extend into the perimeter portion. Once the perimeter portion has cured top divider 52 may be removed and, as set forth in FIG. 20B, the less sticky or less firm pre-cured mix may be injected and allowed to cure.

FIG. 21 illustrates a similar process, but the top divider is not needed to provide full coverage as the moldable material may self-level as indicated.

With reference to FIGS. 22-27, a gasket 10g is represented. This gasket may be any of the dual tackiness and/or firmness as set forth herein. However, with the disclosure that follows, it is pointed out that the gasket 10g may be any of the gaskets of the prior art, but with features set herein, including exposed or non-exposed skeleton and undercut or straight cut features. Furthermore, a bead 58 will be applied to the outer edge of body 12. The bead is not cured, and will cure in place after the (cured) gasket is between the workpiece and base. Moreover, the bead is typically forced into a gap G left b the body of the gasket not reaching the edge of the workpiece. The skeleton 18/20 may or may not extend beyond the outer edge of the body. When it does, it will help bead 58 adhere to the gasket.

Figure 22:
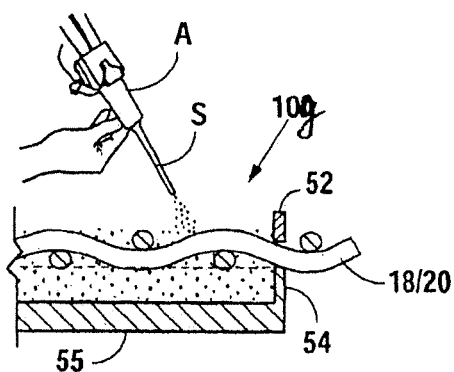
FIG. 22 illustrates an exposed skeleton, beyond the body of the gasket being made by the use of a mold.
Figure 23:
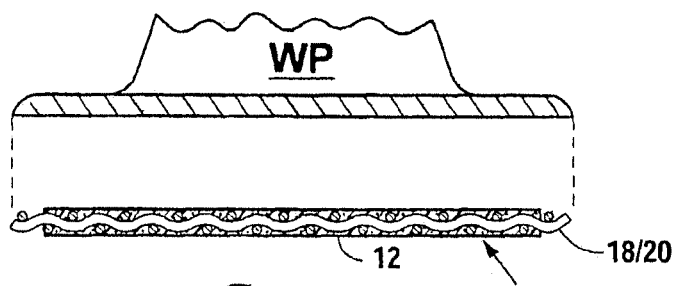
FIG. 23 illustrates the cured, exposed skeleton gasket made by the step illustrated in FIG. 22 aligned with a workpiece which will be applied to a base.

FIG. 22 illustrates the preparation of a gasket 10g, wherein the gasket's skeleton 18/20 extends beyond the outer edges of body 12. Furthermore, in FIG. 23, Applicant illustrates that gasket 10g, which may be either of a single or dual tackiness as set forth above, may be undercut with respect to the workpiece. Typically, however, the bare edges of skeleton 18/20 will go up to the edge of the workpiece as illustrated in FIG. 23.

Figure 24:
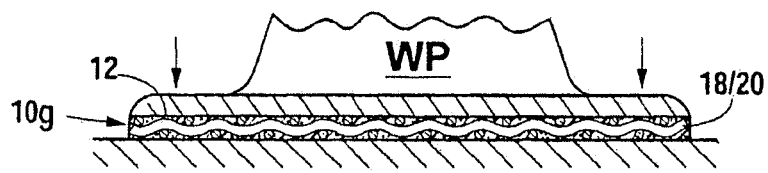
FIG. 24 illustrates the gasket of FIGS. 22 and 23, under compression between the workpiece and base.

In FIG. 24, gasket 10g is seen under sufficient compression such that some of the material comprising body 12 will ooze out to about the edge of the workpiece.

Figure 24A:
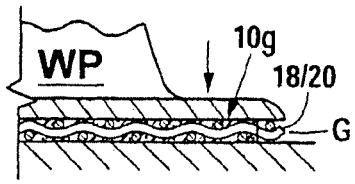
FIG. 24A illustrates a gasket under compression between the workpiece and base, but leaving an exposed skeleton and a gap.

FIG. 24A illustrates an embodiment of the undercut exposed skeleton gasket embodiment 10g, which may be either single or dual tackiness, wherein under some or complete compression material of body 12 does not reach the outer edge of the workpiece. Here, as with the previous embodiment, there is exposed or bare skeleton 18/20 in gap G, but even under compression still leaves some of the skeleton exposed.

Figure 24B:
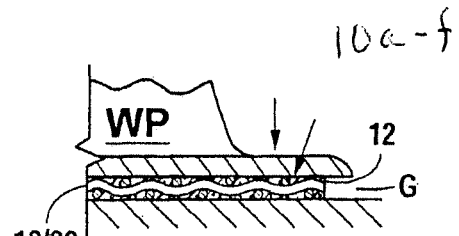
FIG. 24B illustrates a gasket under compression leaving a gap, but no exposed skeleton.

In FIG. 24B, any of the early embodiments are illustrated in an undercut configuration (no exposed skeleton) when a gap G is left even after compression (either partial or complete) of the workpiece against the base.

Figure 25:
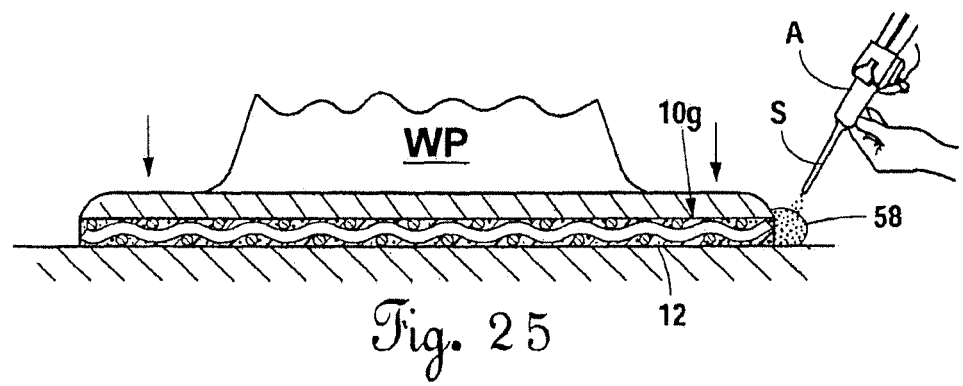
FIG. 25 illustrates the application of a bead to the embodiment of FIG. 24.

Turning to FIG. 25, it is seen that the embodiment of FIG. 24, wherein under compression body material 12 squeezes up to about the edge of the workpiece, bead 58 may be applied through snout S of an applicator applying a curable mix that will cure after application. The material used for the bead will typically be UV resistant and bond to the body 12 of the gasket 10g. One such curable mix from which bead may be made of a polysulfide which has suitable adhesion to a polyurethane body and which is somewhat UV resistant.

Figure 26:
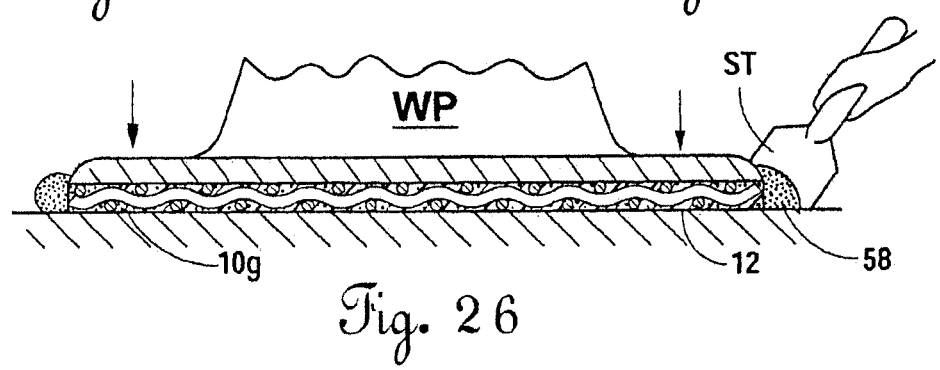
FIG. 26 illustrates a bead being shaped in an optional step, which shaping may be applied to any of the foregoing gap, gapless, exposed, non-exposed skeleton embodiments.

FIG. 26 illustrates the use of a shaping tool ST prior to curing of the bead to shape and to remove excess bead material from the contact between the workpiece, the base, and the edge of gasket 10g.

Figure 25A:
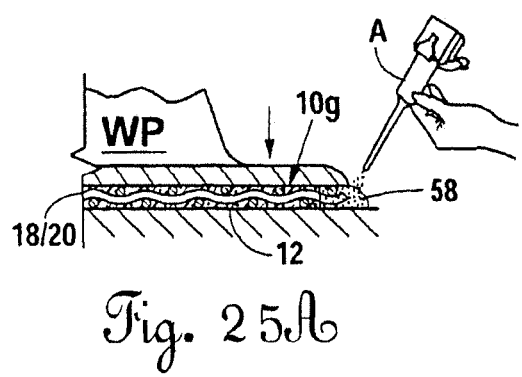
FIG. 25A illustrates the application of a bead to the embodiment of FIG. 24A.
Figure 25B:
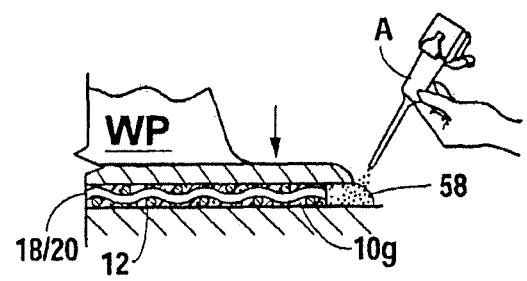
FIG. 25B illustrates the application of a bead to the embodiment of FIG. 24B.

Turning back to FIGS. 25A and 25B, it is seen that bead 58 may be applied to the gap G when an undercut gasket is provided that has an exposed skeleton 18/20 as in FIG. 25A. The term "undercut" here is used to describe an undercut of the body material 12 where, even under compression, the body material leaves a gap between it and the edge of the workpiece. Such a gap is then filled after the workpiece and gasket are placed on the base (see FIG. 25), with a suitable bead material to be cured with the workpiece in place. This bead material may be shaped as illustrated in FIG. 26 or otherwise formed into a suitable shape. In FIG. 25B, undercut refers to the gasket under compression, wherein neither the skeletal material nor the body reaches the edge of the workpiece. Here the gap is filled with the bead 58 (which may extend beyond the edge of the workpiece) as in FIGS. 25 and 25A, and may be shaped.

Figure 27:
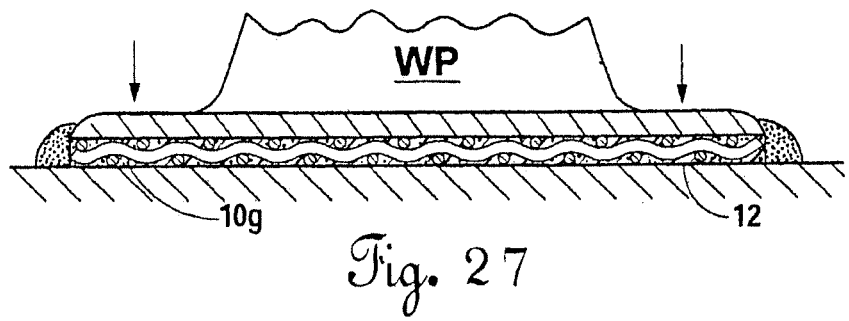
FIG. 27 illustrates the cured bead integral with the body and adjacent, typically contacting the workpiece and base.

FIG. 27 illustrates the final cured bead 58 adjacent to and sealed against gasket 10g, workpiece WP, and the base. The bead is typically firmer and/or less tacky than body 12.

FIGS. 28, 28A, 29, 29A, 30, 30A, 31, 32, 33, and 34 illustrate two embodiments of a gasket 100/100a. Both embodiments are sectioned or layered horizontally (when viewed in cross section) between typically planar or almost planar top and bottom surfaces. In some embodiments, the sections comprise polymers with differing physical properties, but are tacky and elastomeric and flow somewhat under compression, for example, under compression between aircraft parts. The multiple components or sections of the body may be polyurea and/or polyurethane, in some embodiments, and, in some embodiments, which may be a tacky gel, at least in some of the sections or parts. The two or more parts may differ in cured hardness, in some embodiments, for example. In some embodiments, all layers or sections or at least those contacting the aircraft parts are comprised of materials such that the gasket passes ASTM B117 (Salt Fog 3000 hours). The gasket is typically flexible so it may conform to slightly curved aircraft part surfaces.

Turning to FIG. 28, a gasket 100 is comprised of a body having lower section or layer 102 and upper section or layer 104, both layers, in some embodiments about the same thickness, partially engaged in a skeleton or mesh 101 having open spaces or pores to receive the layers, which mesh may be electrically conductive (such as aluminum) for EMI applications or non-conductive. Mesh 101 will help integrate and hold the two layers 102/104 together along a mating surface 103. In some embodiments, the hardness of the two layers differ, one being softer than the other. In one embodiment, one of the two layers is a cured polyurethane or polyurea gel with a hardness between about 40 and 150 on 35 gr. cone penetrometer. The other layer is harder or softer.

FIG. 29 illustrates a three layer or three section gasket 100a. Here, layers or sections 106/108/110 (upper/middle/lower) are shown and, in some embodiments, differ in hardness from one another. In some embodiments 110/106, the outer sections may be softer than inner section 108. In some embodiments, such as the one illustrated, skeleton or mesh 101 is wholly within center section 108, but in other embodiments, the skeleton or mesh may extend into either the upper and/or the lower sections to provide integrity to gasket 100a. In preferred embodiments, the sections are tacky, releasable and non-adhesive to the aircraft parts.

FIG. 30 illustrates gasket 100 where, as in the previous embodiments, the bodies may be a polyurea or polyurethane two-component cured mix and the bodies may differ in hardness. FIG. 30 shows that one of the several sections, here section 104, may extend asymmetrically past the mesh to provide, in some embodiments, greater deformation under compression.

In some embodiments, the sections may be thin, in the range of 2-10 mil for one example. In some embodiments, these one or more thin layers are outer layers of the gasket, and are softer than the non-thin or non-outer layers. In some embodiments, they are a soft polymer gel.

FIGS. 28A, 29A, 30A, and 31 illustrate methods of making gaskets 100/100a. In some embodiments, an applicator A is used having two compartments, a forcing element and a mixing straw 109. A two-part polymer mix 107 comes out of mixing straw 109 formed from combining parts 109a/109b (one part in each of the two applicator compartments). For example, one part may be of polyol and the other part from an isocyanate. In FIGS. 28A, 29A, and 30A, the mix 107 is applied to the body and/or skeleton as a perimeter (inner perimeter or outer perimeter) 111 (see also FIG. 33). The perimeter may have the same or different properties, for example, hardness, as compared and contrasted to sections 102/104/106/108/110/112/114. In some embodiments, a gasket comprised of cured polymer sections is provided with the skeleton exposed at the edges and is placed between aircraft parts with at least some of the exposed skeleton extending beyond the gap, and the applicator applied cure in place mix 107 is then applied.

In FIG. 33, it is seen that a gasket with perimeter 111 may "hide" mating surface 103 and protect the perimeter of skeleton 101 from exposure to the elements. The horizontally sectioned gasket, when placed under compression between two parts, such as aircraft parts 118/120, may display somewhat different flow characteristics which may assist, in some embodiments, with an effective environmental seal along with effective removal of one aircraft part "clean" from another aircraft part—that is leaving the gasket clearly attached to a first part of the aircraft when two parts 118/120 are removed from one another.

FIG. 31 illustrates a manner in which gaskets 100/100a may be made by using a mold 116 and laying skeleton or mesh 101 in the mold. A first pouring or injection of a first polymer mix may be laid in the mold before or after the skeleton is laid in the mold and the mold filled to a line L, with a first pre-cured section, which, in some embodiments, is then allowed to cure to form a cured section. Then, a second pre-cured section may be poured on applied atop the first component and, after curing, the gasket may be removed from the mold. Gaskets may be die cut following removal from the mold, in some embodiments, die cut to the footprint of an aircraft parts footprint, or slightly larger or slightly smaller. An adhesive 113 may be applied between any sections to improve bonding between the sections, but typically the outer surfaces of the outer sections (upper and lower) are tacky to the aircraft surfaces and do not bond with them as would an adhesive.

FIG. 32 illustrates gasket 100/100a sectioned horizontally and placed between two aircraft parts 118/120, and placed under compression by, for example, fasteners (not shown). Upon removal of one of the two pieces 118/120 from the other, the stickier side of the gasket will stay attached to the part in which it is in contact with. The two aircraft parts may be: floorboards and stringers; aircraft antennas and aircraft antenna bases; and fuel access panels.

Gasket includes tape also. A single sided sticky gasket tape 100c may be made (see FIG. 34) by the method of cutting as seen in FIG. 14 of U.S. Pat. No. 6,695,320, Applicant's patent incorporated herein by reference. The body of the tape may be from multiple sections as set forth herein and, in some embodiments, includes an outer layer that is sticky, in some cases with a hardness between 30 and 150, 35 gram penetration and a firmer second layer (up to Shore A80) and, in some embodiments, a skeleton that allows some stretch (up to 30%) like a molded nylon skeleton. Indeed, any gasket embodiments disclosed herein may, in some embodiments, have such properties. The tape may be used to wrap cables or where cables connect to other parts with metal connectors. Other uses for the single sided sticky tape include under floorboards, lavatories, door sills, and on top of stringers for supporting floorboards. In some cases, it is used sticky side down, but may be used as a wrap instead of under compression between two aircraft parts.

Figure 35:
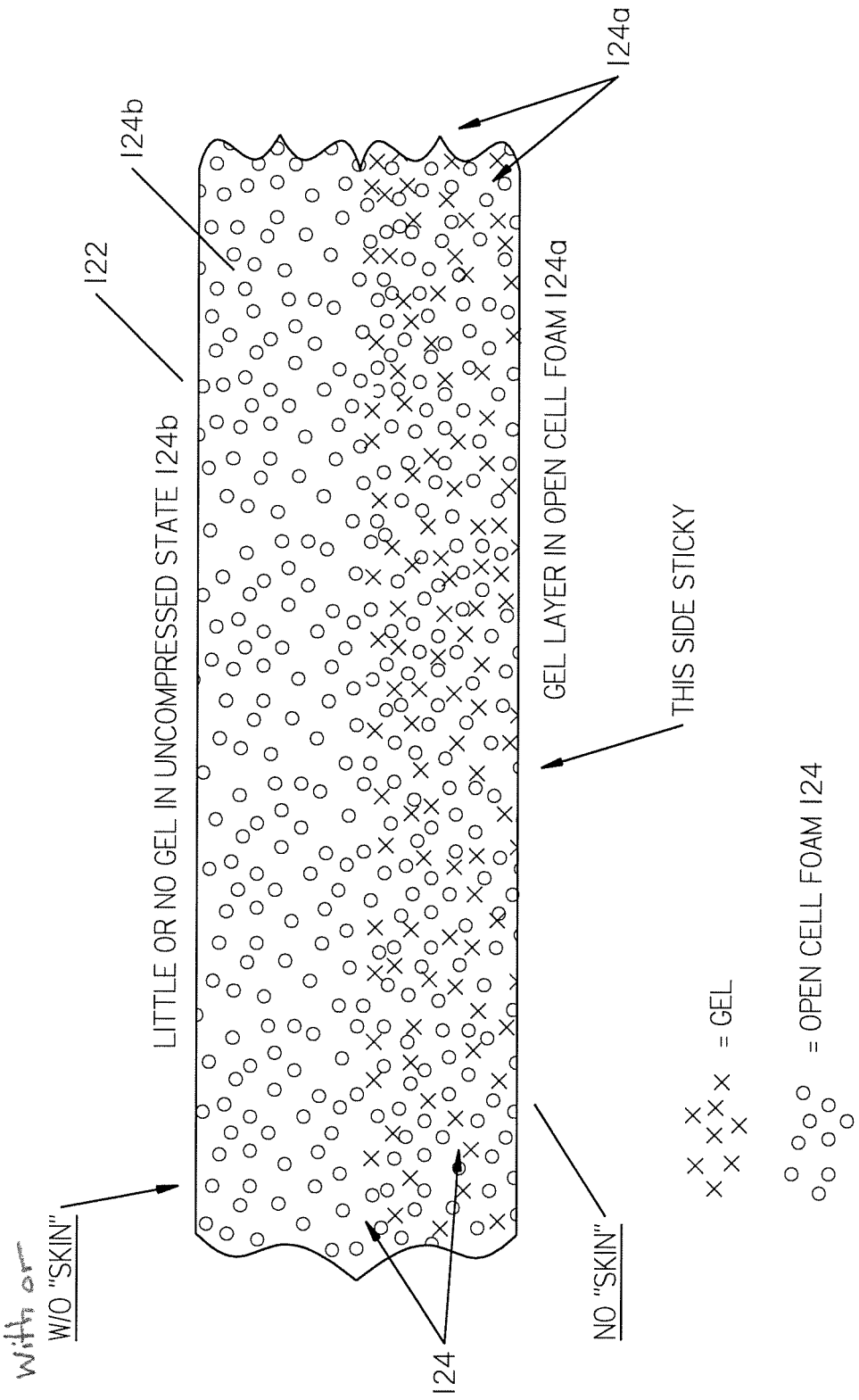
FIG. 35 shows a preferred embodiment for the horizontally sectioned gasket, this one with an at least partially open cell foam skeleton having, in an uncompressed state, a polymer on one side and none on the other.

FIG. 35 shows an additional preferred embodiment for a horizontally sectioned foam gasket 122, this one with an at least partially open cell foam skeleton. The at least partially open cell foam skeleton 124 is partially or completely soaked, in some embodiments, on one side 124a only with an uncured polyurethane gel which is then allowed to cure. Thus, one side 124a of the foam and the border area around one side of the foam has a cured polyurethane at least partially soaked therein and, on the opposite "dry" side 124b, there is an area that has little or no cured polyurethane. When such gasket or tape comprising the one-sided cured gel is placed under compression, in some embodiments, some of the gel will migrate upward and some will migrate outward, but the tape or gasket 122 would be more sticky around the gel side than on the non-gel side, even though there may be some migration of gel from gel section to non-gel section under compression. This creates a "single-sided sticky" with ease of removal of one of the pieces (from the non-sticky side) compared to the sticky side (the sticky side)—and, especially clean removal.

Manufacturing a single-sided sticky horizontally section foam gasket 122 may be achieved by placing uncured gel in a form on a sheet or on a table and laying the uncompressed, dry foam on top thereof. Slight pressure or compression may be needed to allow absorption of the gel into the one (here the bottom) side—typically the thickness of the foam, uncompressed, will be greater than the layer of the uncured gel onto which it is placed. When the gel cures, the gasket can be removed and more gel will be on the sticky side 124a than on the "dry" side 124b.

Note that in many previous embodiments, the horizontally section gasket has two or more polymer layers that differ in some property—such as hardness or tackiness. In this FIG. 35 embodiment, there may be a gasket or tape with no—or almost no—polymer on one side, but polymer on the other side. So, one gel or polymer, not two, but still sectioned in the sense that there is a horizontal layer of gel on one side, but no layer on the other (at least in an uncompressed state).

It is intended that hardness is one of a number of different properties the sections may have. In other words, the two or more layers may have one or more differing properties and hardness, or any of the other properties set forth herein is but one of these.

Gasket or tape properties (one, more or all sections)—pass the following test: Flammability FAR 28.853a (application Ser. No. 15/6797,266, filed Sep. 6, 2017, see incorporated herein by reference). Through the use of Av-Dec Part No. HT3935-7F for the body. Aircraft fluid resistance (see US2019/0002730, incorporated herein by reference) in part, through the use of Av-Dec HiTAK Conduct Antenna Gasket for the body. Thickness of the gasket before compression may be about 35-80 mil. Thickness after compression may be about 10 to 50 mil.

The gasket or tape may be provided with materials such that it passes ASTM D-543 for one or more of Jet A (<10% 35 min. immersion), Skydrol (<10% 35 min. immersion), water (<1% 168 hr. immersion), propylene glycol (<1% 96 hr. immersion) absorption and with a service temperature between −65° C. to 135° C. This is provided by using a body comprising HiTAK Conductive Antenna Gasket and a skeleton such as aluminum woven mesh.

The mesh or skeleton 101 may be electrically conductive or non-conductive. Electrically conductive may be 5056 or other aluminum alloy mesh, in some embodiments, Monel or the like in a thickness range of about 10-40 mil before compression. Non-conductive mesh may be woven fiberglass, or molded nylon (see U.S. application Ser. No. 14/484,570, filed Sep. 12, 2014, incorporated herein by reference.)

The layers may differ in one or more physical and/or chemical properties. For example: peel strength between 0.8 piw and 8.0 piw (cured layers) on sections with peel strength deltas (differences between peel strength of the two layers or more) between 0.4 piw and 6 piw. In some embodiments, peel strength between 5 and 20 piw, in one range, with peel strength deltas of 2 to 14 piw. Elongation, in some embodiments, may be between 0% and 35% with elongation deltas 1% to 30%. In some cases, elongation of the section may be the same but hardness may differ. Hardness ranges cone penetrometer (35 gram) 30 or more up to Shore A 90, with hardness deltas between about 5 and 100. In some embodiments, at least one layer is a gel in the 30 to 150 range, 35 gram half cone penetrometer and another layer of the same gasket is harder, up to 80 on Shore "00" scale or softer.

In some embodiments, one, more or all of the layers may have electrically conductive particles such as those found in U.S. Pat. No. 6,638,488 or US 2007/0056769, both incorporated herein by reference.

All dimensions set forth herein are approximate and the ranges may be varied to suit specific applications.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A gasket for use as an environmental seal between a first aircraft part having a planer surface and a second aircraft part having a planer surface, first and second aircraft parts spread apart and engaged with fasteners, the gasket compressible between the planer surfaces, the gasket comprising:
a first elastomeric tubular portion having tabular portion properties and having a first tabular thickness, a length and a width, the length and width being much greater than the first tabular thickness;
a second elastomeric tubular portion having tabular portion properties and having a second tabular thickness, a length and a width, the length and width being much greater than the second tabular thickness; and
a tabular skeleton;
wherein the first and second tabular portions extend substantially the entire length and width of the gasket;
wherein the first and second tabular portions and the skeleton are all positioned parallel to one another and the first and second tabular portions are at least partly embedded in the skeleton;
wherein the skeleton is at least partly contacting one of the tabular portions; and
wherein the first tabular portion and the second tabular portion differ in at least one tabular portion property.

2. The gasket of claim 1, wherein the first and second tabular portions differ in thickness.

3. The gasket of claim 1, wherein the differing tabular portion property is peel strength.

4. The gasket of claim 3, wherein one of the first or second portion has a peel strength of between 0.50 and 20 piw.

5. The gasket of claim 4, wherein the other of the first and second tabular portions has a peel strength different but still in the range of 0.50 and 20 piw.

6. The gasket of claim 1, wherein the differing tabular portion property is transparency.

7. The gasket of claim 1, wherein the gasket further includes an edge portion in contact with at least one of the first and second tabular portions.

8. The gasket of claim 1, wherein the gasket further includes an edge portion in contact with the skeleton and the first and the second tabular portions.

9. The gasket of claim 1, wherein at least one of the first and second tabular portions is either polyurea or polyurethane.

10. The gasket of claim 1, wherein the skeleton is electrically conductive.

11. The gasket of claim 1, wherein the skeleton is not electrically conductive.

12. The gasket of claim 1, wherein the skeleton is foam.

13. The gasket of claim 1, further including a third tabular portion.

14. The gasket of claim 1, wherein the differing tabular portion property is hardness.

* * * * *